United States Patent [19]
Carpentier

[11] Patent Number: 5,469,890
[45] Date of Patent: Nov. 28, 1995

[54] HOSE MOBILE PLUG

[76] Inventor: James R. Carpentier, 1512 Walnut Dr., Alamogordo, N.M. 88310

[21] Appl. No.: 329,986

[22] Filed: Oct. 27, 1994

[51] Int. Cl.$^6$ .................................................. F16L 55/11
[52] U.S. Cl. .................................................. 138/89; 138/94
[58] Field of Search ........................... 138/89, 89.1, 89.4, 138/92, 94; 220/287, 306, 308; 285/332.2, 332.4, 334.2, 334.3, 374, 921; 137/800

[56] References Cited

U.S. PATENT DOCUMENTS

| | | | |
|---|---|---|---|
| 3,677,301 | 7/1972 | Williams | 138/92 |
| 3,814,136 | 6/1974 | Johnson et al. | 138/89 |
| 3,893,487 | 7/1975 | Engelking | 138/89 |
| 4,274,455 | 6/1981 | Simons | 138/89 |
| 4,938,314 | 7/1990 | Sitzler et al. | 138/89 |
| 5,197,605 | 3/1993 | Hampton | 138/89 |
| 5,224,515 | 7/1993 | Foster et al. | 138/89 |
| 5,351,718 | 10/1994 | Barton | 138/94 |

*Primary Examiner*—David Scherbel
*Assistant Examiner*—James F. Hook

[57] ABSTRACT

A solid plug for insertion in the quick disconnect fitting of a hose mobile unit (a hose coiled on a hose reel) which will prevent unwanted drainage while the unit is in storage. The plug is cylindrical with a plurality of spaced annular projections designed to mate with internal surfaces within the quick disconnect fitting and with an annular elastomeric gasket at its inner end to engage with and form a seal in the end of ring or gasket the hose projecting into such quick disconnect fitting. Such plug also carries means for attaching the plug to the hose when it is not in place in such fitting.

1 Claim, 4 Drawing Sheets

HOSE MOBILE PLUG

BACKGROUND OF THE INVENTION

1. Field of the Invention

The present invention relates to hose plugs and more particularly pertains to such plugs which are adapted specifically for use with hose mobiles to prevent dripping and drainage from the hose reel while it is stored and not in use.

2. Description of the Prior Art

Using an obstructing device to prevent liquid from exiting an opening is obviously extremely old and ranges from the little Dutch boy with his finger in the dike to sophisticated closures for a variety of end uses.

The use of hose plugs is also well known in the prior art. More specifically, plugs heretofore devised and utilized for the purpose of preventing leakage are known to consist basically of familiar, expected and obvious structural configurations, notwithstanding the myriad of designs encompassed by the crowded prior art which have been developed for the fulfillment of countless objectives and requirements. Typical of some of these are the devices disclosed in U.S. Pat. Nos. 4,436,117; 4,301629; 4,160,465; 3,797,442; and 3,601,361, none of which are designed for the same specific end use as is the plug of the present invention.

In this respect, the plug according to the present invention substantially departs from the conventional concepts and designs of the prior art, and in so doing provides a device primarily developed for the purpose of closing off the end of a quick disconnect fitting on a hose mobile to prevent leakage when in storage.

Therefore, it can be appreciated that there exists a continuing need for new and improved plugs which can be used with hose mobiles. The present invention substantially fills this need.

SUMMARY OF THE INVENTION

In view of the foregoing disadvantages inherent in the known types of plugs now present in the prior art, the present invention provides an improved plug construction wherein the same can be utilized to eliminate leakage from a stored hose mobile. As such, the general purpose of the present invention, which will be described subsequently in greater detail, is to provide a new and improved hose plug apparatus which has all the advantages of the prior art devices and none of the disadvantages.

To attain this, the present invention essentially comprises a solid plug for insertion in the quick disconnect fitting of a hose mobile unit (a hose coiled on a hose reel) which will prevent unwanted drainage while the unit is in storage. The plug is cylindrical with a plurality of spaced annular projections designed to mate with internal surfaces within the quick disconnect fitting and with an annular elastomeric gasket at its inner end to engage with and form a seal in the end of the hose projecting into such quick disconnect fitting. Such plug also carries means for attaching the plug to the hose when it is not in place in such fitting.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hose mobile plug which has all the advantages of the prior art devices and none of the disadvantages.

It is another object of the present invention to provide a new and improved hose mobile plug which may be easily and efficiently manufactured and marketed.

It is a further object of the present invention to provide a new and improved hose mobile plug which is of a durable and reliable construction.

An even further object of the present invention is to provide a new and improved hose mobile plug which is susceptible of a low cost of manufacture with regard to both materials and labor, and which accordingly is then susceptible of low prices of sale to the consuming public, thereby making such plugs economically available to the buying public.

Still yet another object of the present invention is to provide a new and improved hose mobile plug which provides in the apparatuses and methods of the prior art some of the advantages thereof, while simultaneously overcoming some of the disadvantages normally associated therewith.

Still another object of the present invention is to provide a new and improved plug for sealing the quick disconnect fitting of a hose mobile.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
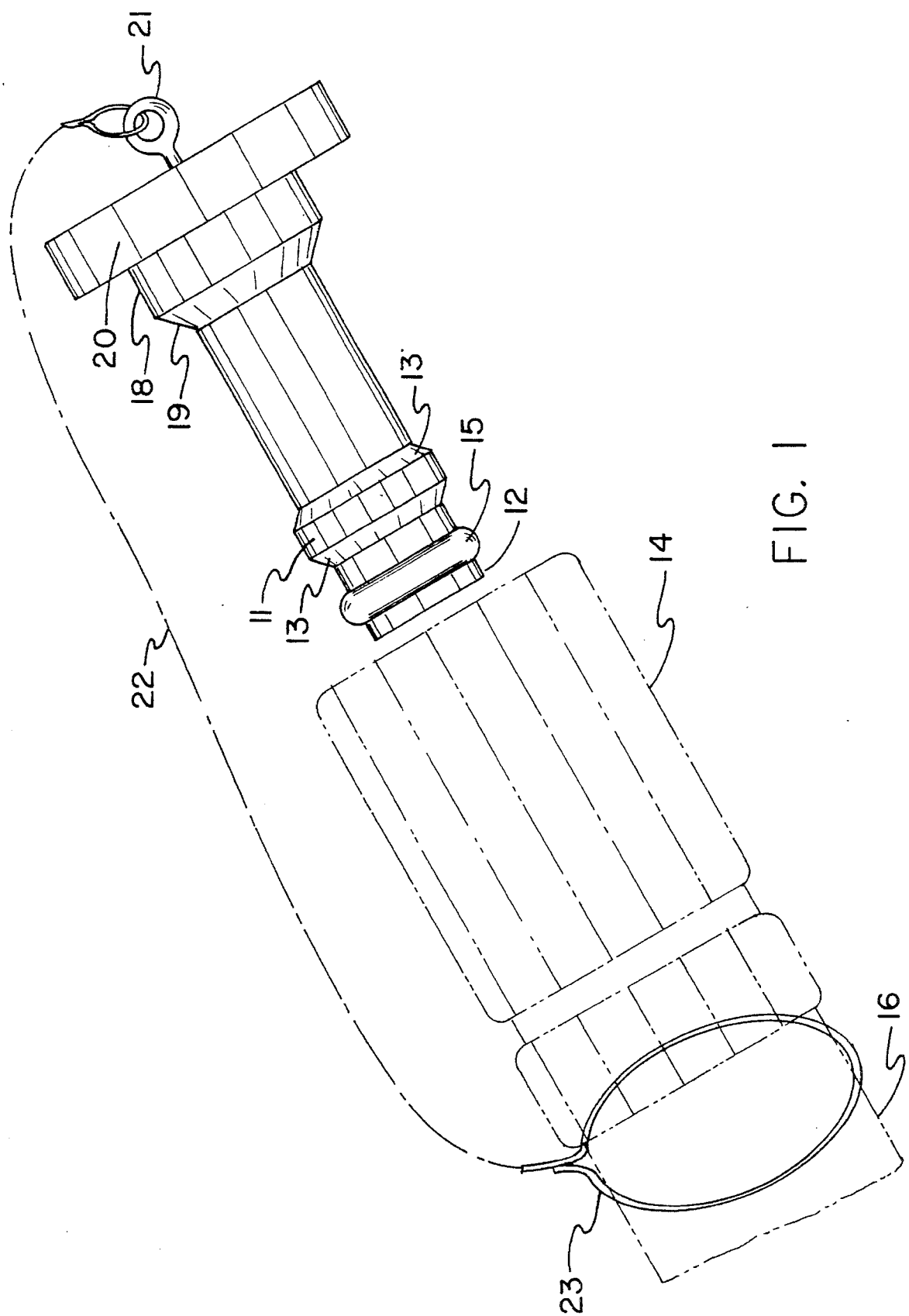
FIG. 1 is a side plan view of the plug of the present invention showing its relationship to the quick disconnect fitting of a hose mobile.
Figure 2:
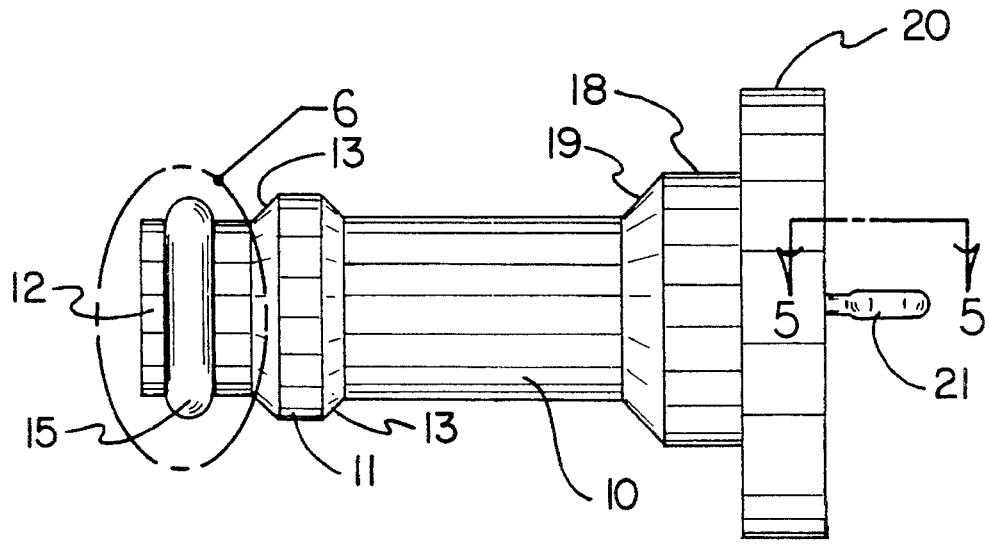
FIG. 2 is a side plan view of the plug only.

With reference now to the drawings, and in particular to FIGS. 1 and 2 thereof, a new and improved hose mobile plug embodying the principles and concepts of the present invention and generally designated by the reference numeral 10 will be described.

More specifically, it will be noted that the plug 10 is generally cylindrical in shape with an annular projection 11 near the lower end 12 thereof. Such projection 11 has lead-in tapered edges 13 thereon to permit a sliding fit with the interior surface of a quick disconnect fitting 14, shown in broken lines on FIG. 1. Also adjacent the lower end 12 of plug 10, is a replaceable, annular, elastomeric ring or gasket 15. Such ring 15 projects annularly around the tubular lower end 12 of plug 10 which is of suitably small diameter to snugly fit within the hose end 16 to which is affixed the quick disconnect fitting 14. This causes the annular, elastomeric ring 15 to engage with and seal off such end within the fitting 14. At the upper end 17 of plug 10 is another annular projection 18, again with a tapered lead-in edge 19, such projection 18 snugly engaging the outer end of fitting 14. An end-cap 20 terminates said upper end 17 of plug 10, and is of a larger diameter than the opening of fitting 14, thereby preventing further extension of plug 10 into fitting 14. A threaded eye-bolt 21 is mounted to the exterior surface of cap 20, providing an anchor for one end of a securing cable 22 having the other end thereof secured to an annular clamp 23 extending around the hose 16.

Figure 3:
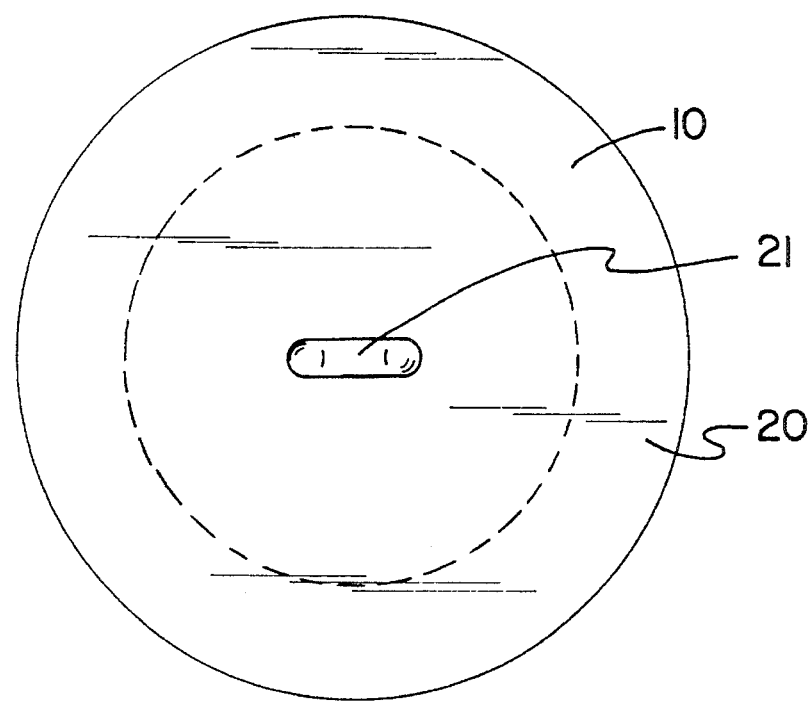
FIG. 3 is top plan view of the plug of FIG. 1.
Figure 4:
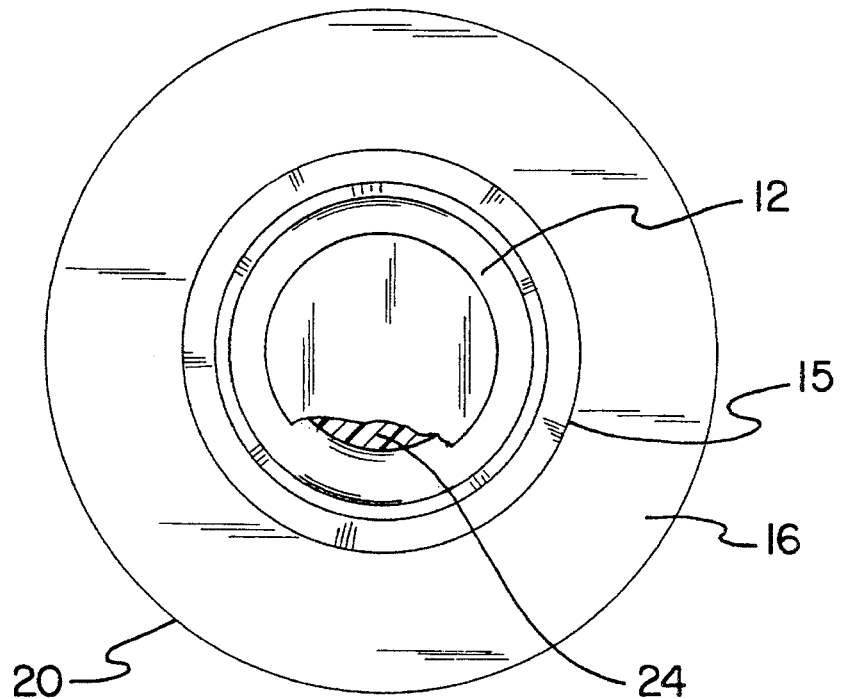
FIG. 4 is bottom plan view of such plug.

FIGS. 3 and 4 show respectively the top and bottom of plug 10, illustrating that the tubular plug is solid as shown at 24 in FIG. 4.

Figure 5:
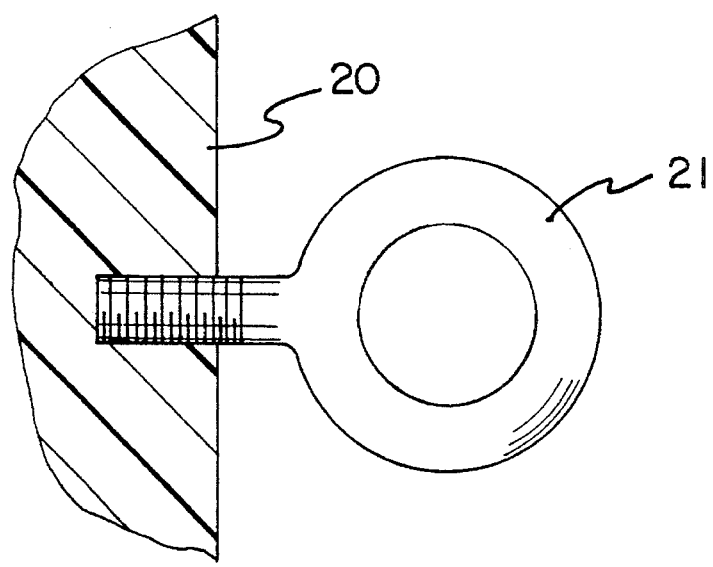
FIG. 5 is a side plan view of the upper end only of such plug, taken on line 5—5 of FIG. 2.

FIG. 5 shows in detail the threaded eye-bolt 21 mounted on the exterior surface of cap 20.

Figure 6:
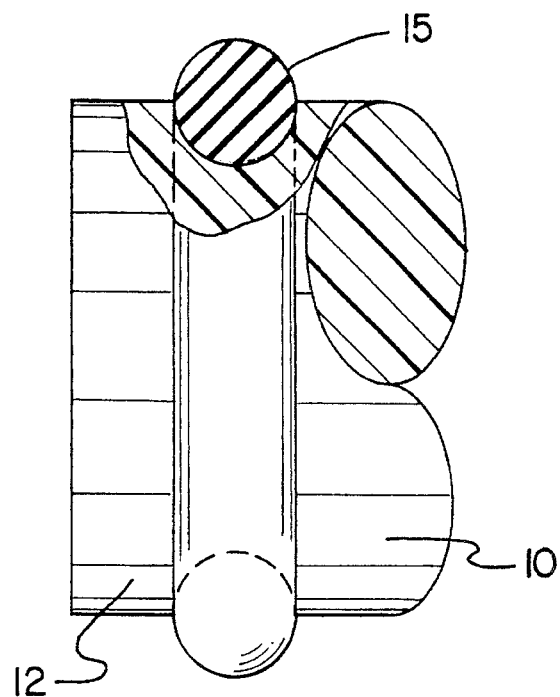
FIG. 6 is an enlarged detail in partial section of the area indicated by the circle 6 on FIG. 2.
Figure 7:
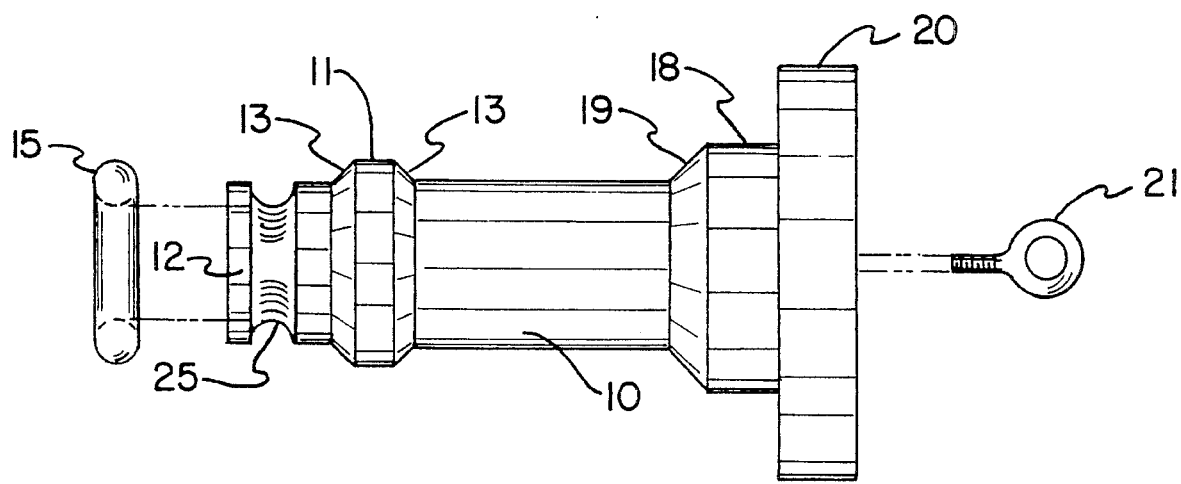
FIG. 7 is an exploded side plan view of the plug shown in the preceeding drawings.

FIG. 6 is a partially sectioned view showing the elastomeric ring 15 surrounding the lower end 12 of the solid plug 10, while FIG. 7 illustrates in exploded form the plug 10 per se along with the removeable threaded eye-bolt 21 and the replaceable gasket or ring 15, as well as the grooved retaining portion 25 of plug 10 into which ring 15 seats.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Preferably the plug is formed from a high impact plastic.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved hose mobile plug combined with a real-mounted hose for prevention of fluid drainage from a stored hose comprising in combination:

a generally cylindrical plug formed of a rigid material being a solid structure having an upper end and a lower end;

a first annular projection being spaced from the lower end and having a pair of lead-in tapered edges being circumferentially positioned around the projection in parallel planes, the first annular projection capable of a slidable fit within a quick disconnect fitting of a reel-mounted hose, the quick disconnect fitting having an interior diameter and an outer end;

a retaining portion adjacent the lower end of the plug and spaced from the first annular projection, the retaining portion having seated therein an elastomeric ring;

an end cap having an exterior end integral with the upper end of the plug, the exterior end having a threaded aperture therein, the end cap having an enlarged diameter greater than the interior diameter of the quick disconnect;

a second annular projection being adjacent the end cap and having a lead-in tapered edge being circumferentially positioned around the projection and spaced from the end cap, the second annular projection having a size larger than the first annular projection and smaller than the end cap, the second annular projection further being capable of snugingly engaging the outer end of the quick disconnect fitting; and a securing cable having a small looped portion at one end and an annular clamp at another end, the small looped portion having been coupled to a threaded eye-bolt, the annular clamp being capable of being positioned around the hose adjacent the quick disconnect fitting, the eye-bolt capable of coupling with the threaded aperture of the end cap, the securing cable having a length for allowing the plug to be positioned within the quick disconnect fitting of the hose while the cable hangs adjacent the plug in the fitting when the eye-bolt being secured within the end cap and the clamp being secured around the hose.

* * * * *